Dec. 3, 1946.                H. A. FINK                2,412,137
                      CROWN CAP CONVEYING SYSTEM
                 Filed Jan. 17, 1944        3 Sheets-Sheet 1
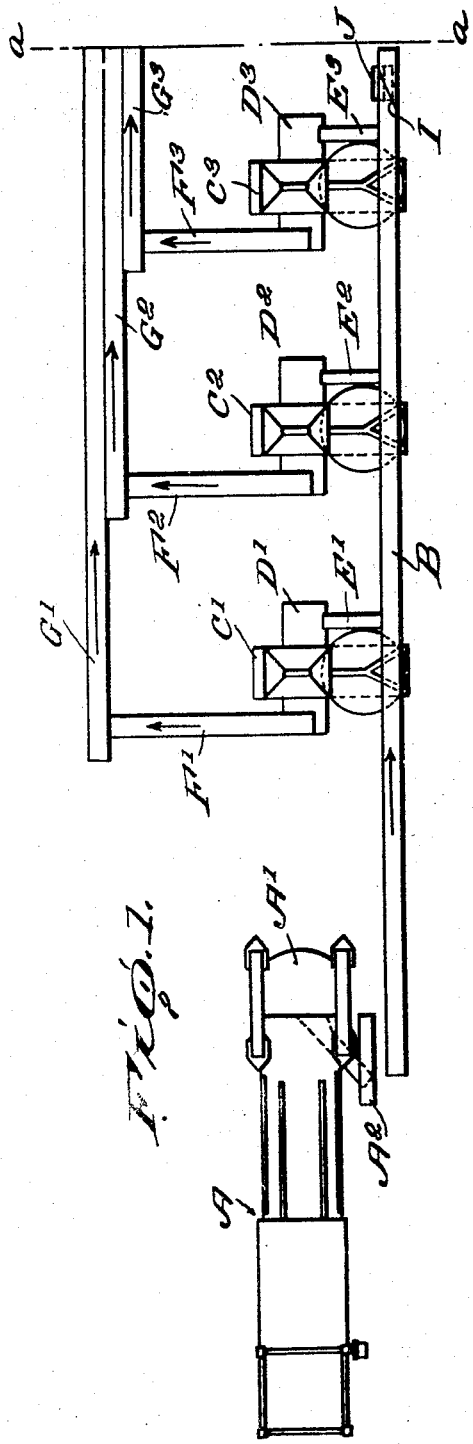
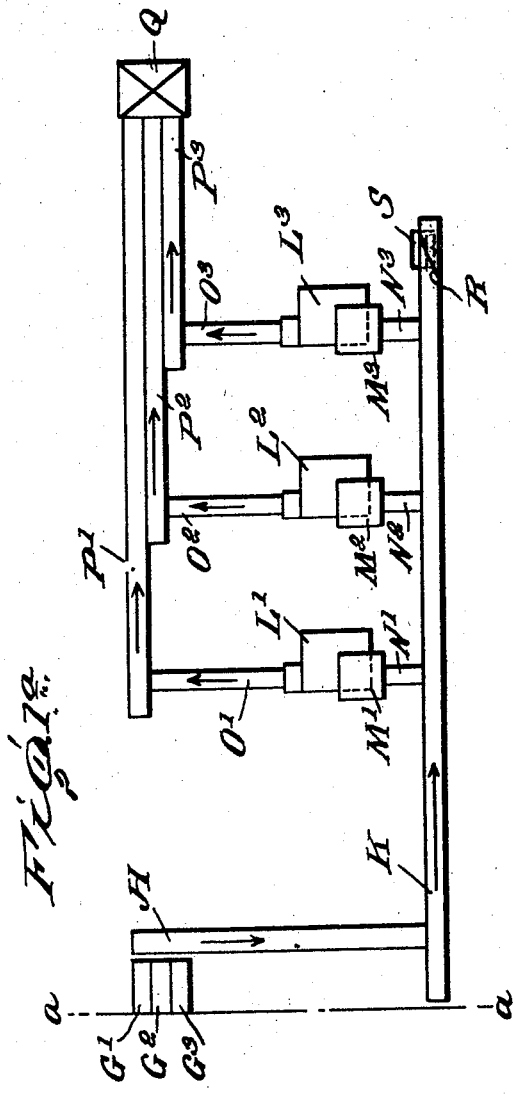
Inventor
Henry A. Fink
By Mason, Porter & Willer
Attorneys

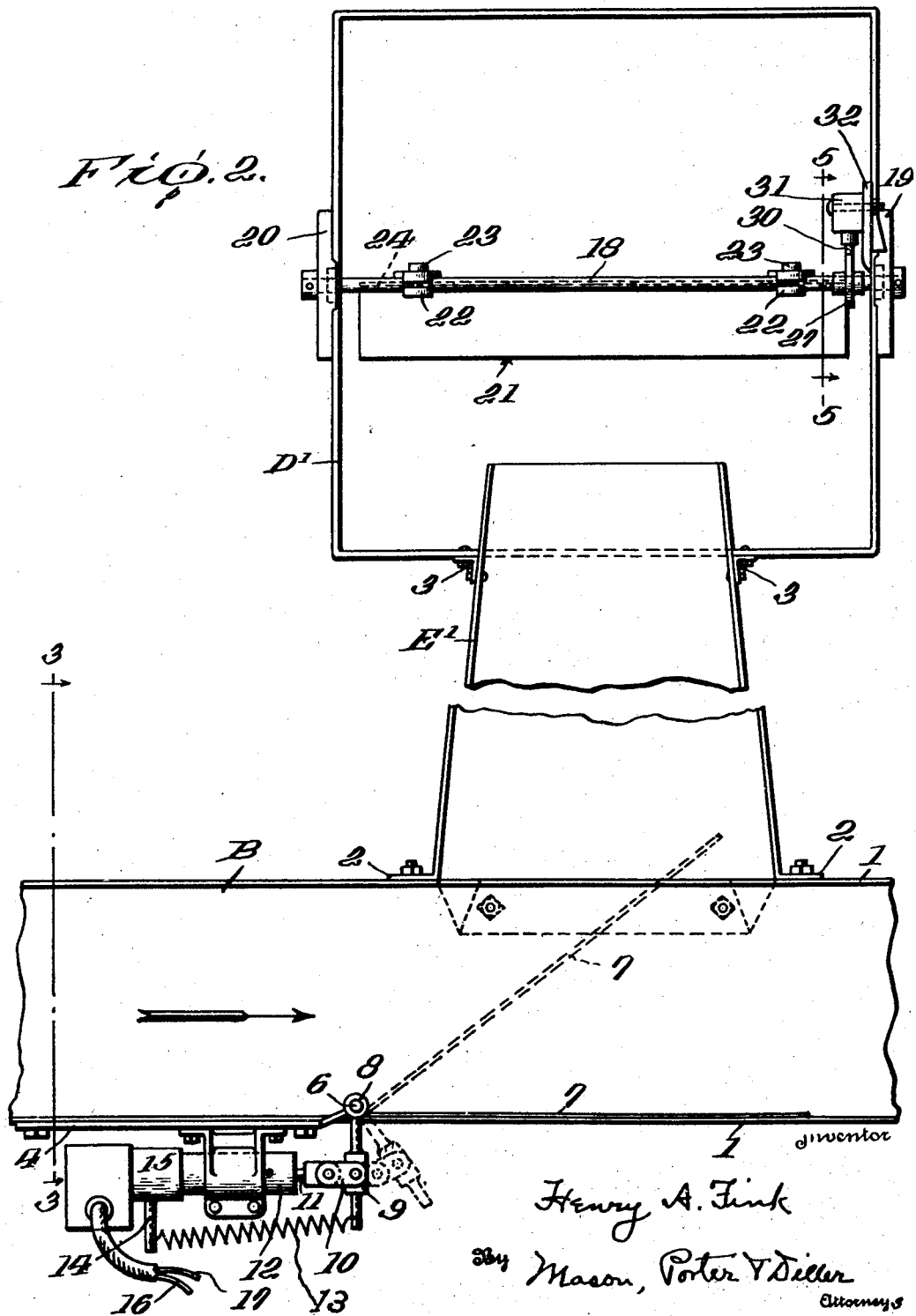

Dec. 3, 1946. H. A. FINK 2,412,137
CROWN CAP CONVEYING SYSTEM
Filed Jan. 17, 1944 3 Sheets-Sheet 3
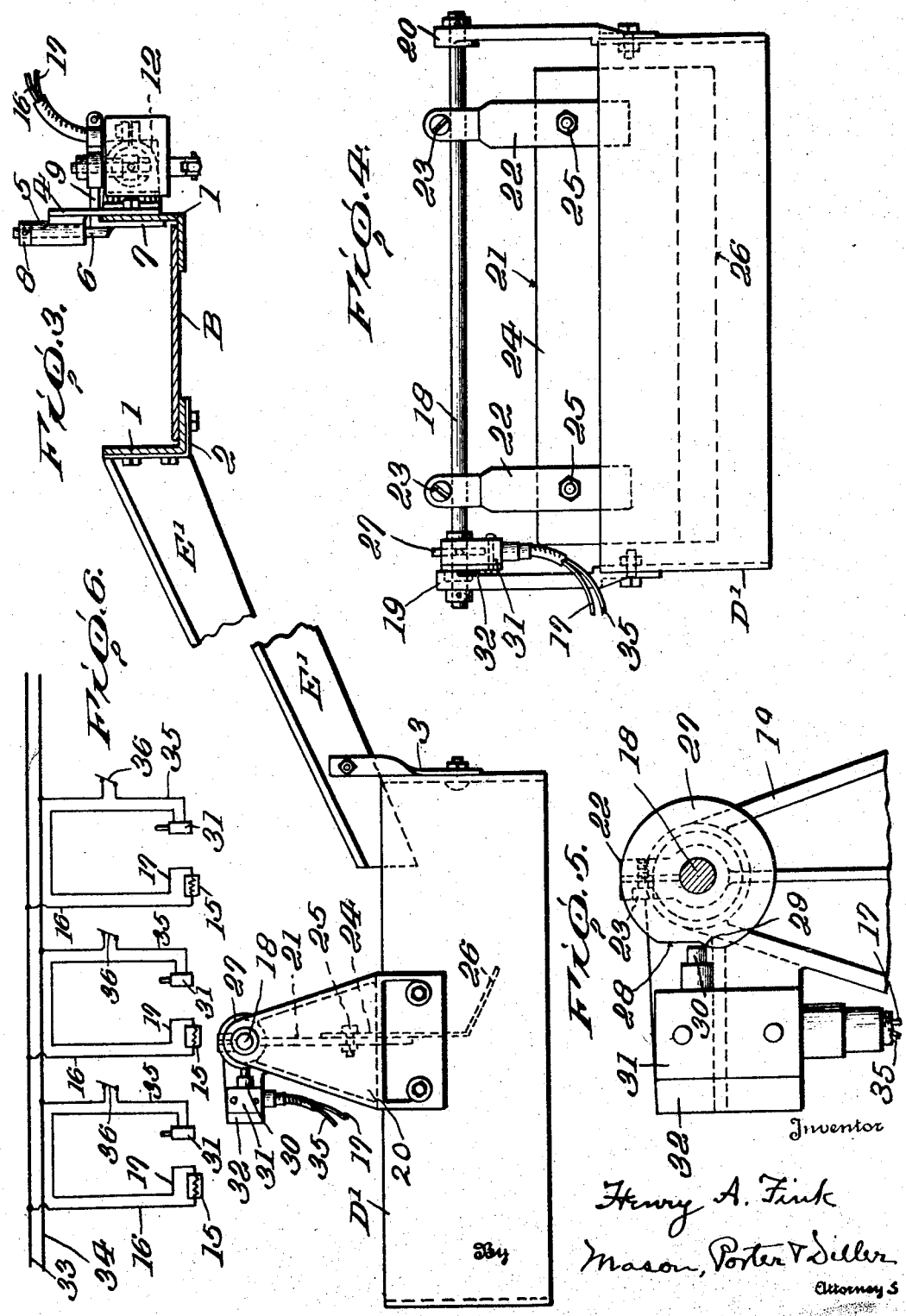

Patented Dec. 3, 1946

2,412,137

UNITED STATES PATENT OFFICE 2,412,137

CROWN CAP CONVEYING SYSTEM

Henry A. Fink, Pelham Manor, N. Y., assignor to Continental Can Company, Inc., New York, N. Y., a corporation of New York Application January 17, 1944, Serial No. 518,572

2 Claims. (Cl. 198—20)

This invention relates to mechanism for controlling the feeding of work articles and more particularly to mechanism for automatically apportioning the feeding of work articles to the individual machines of groups or batteries of machines adapted to perform similar and/or successive operations on the articles. Mechanism embodying the invention is especially adapted for use in the making of crown caps but may be used in connection with other manufacturing operations.

An object of the invention is to provide an improved arrangement of a plurality of machines for performing similar operations on work articles in combination with means for conveying articles to the machines and automatic control mechanism for so apportioning the feeding of articles from the conveying means to the respective machines as to insure that each machine will always be furnished with an adequate supply of articles to be worked upon.

Another object of the invention is to provide equipment of the character referred to which is especially adapted for use in the manufacturing of crown caps.

A further object of the invention is to provide mechanism responsive to piling up of work articles in a receptacle for operating a deflector gate to discontinue delivery of articles from a travelling conveyor to the receptacle while the conveyor continues to run.

Other objects of the invention will become apparent from a reading of the following detailed description of a representative embodiment of the invention, the appended claims, and the accompanying drawings.

In the drawings:

Figure 1 is a diagrammatic plan view showing a preferred arrangement of a primary machine for preparing articles, such as cross cap blanks, three machines for performing similar subsequent operation on the articles such as inserting cork discs in cap blanks, and mechanism for conveying articles from the primary machine to the other three machines and then away from said other three machines.

Figure 1ᵃ is a diagrammatic plan view showing a preferred arrangement of three additional machines for performing further similar operations on the articles, such as inserting paper discs in assembled caps and cork discs, and mechanism for conveying articles from the three machines shown in Figure 1 to said additional machines and then away from them. It is intended that Figure 1ᵃ be read as a continuation of Figure 1, as though the two figures were joined along the line a—a.

Figure 2 is a top plan view of a feeding conveyor, a hopper or receptacle, a dividing way for transporting articles from the conveyor to the hopper or receptacle, and mechanism for controlling the passage of articles over the dividing way.

Figure 3 is a section on the line 3—3 of Figure 2.

Figure 4 is an end elevation of the hopper or receptacle and associated control mechanism as viewed from the left of Figure 3.

Figure 5 is an enlarged scale fragmentary section on the line 5—5 of Figure 2 showing a switch and operating cam forming part of the control mechanism.

Figure 6 is a wiring diagram.

The illustrative embodiment of the invention shown diagrammatically in Figures 1 and 1ᵃ includes a machine group A including a press $A^1$ for forming crown cap blanks from flat sheet material. Formed blanks are delivered by an elevating conveyor $A^2$ to a horizontal travelling feeding conveyor B. Three similar machines $C^1$, $C^2$, and $C^3$ for inserting cork discs in the press cap blanks are deployed along the conveyor B and are equipped respectively with hoppers or receptacles $D^1$, $D^2$, $D^3$ for containing supplies of cap blanks in which the cork discs are to be inserted by the associated machines $C^1$, $C^2$, and $C^3$. Pressed blanks are delivered from the conveyor B to the hoppers $D^1$, $D^2$, $D^3$ respectively over dividing ways of passage $E^1$, $E^2$, and $E^3$. Mechanism to be described later automatically controls the flow of cap blanks over the dividing ways in accordance with the size of the supply of blanks in the respectively associated receptacles or hoppers. Cap blanks and cork discs assembled by the machines $C^1$, $C^2$, and $C^3$ are deposited respectively upon conveyors $F^1$, $F^2$, and $F^3$ which discharge onto conveyors $G^1$, $G^2$, and $G^3$ which in turn deliver the assemblies to a single inclined elevating conveyor H. Any surplus cap blanks which are carried by the conveyor B past all three cork disc inserting machines are deflected laterally by a baffle I so as to fall into a surplus receiving receptacle or chute J.

The assembled cap blanks and cork discs are discharged from the elevating conveyor H to a horizontal feeding conveyor K along which are deployed three similar machines $L^1$, $L^2$, and $L^3$ adapted to insert paper discs in the cap blanks and glue them in place on the cork discs. The machines $L^1$, $L^2$, and $L^3$ are provided respectively with hoppers or receptacles $M^1$, $M^2$, and $M^3$ adapted to hold a supply of assembled caps and cork discs so as to provide for continuous feeding of such assemblies into the paper disc inserting machines. Automatic mechanism to be described later controls the flow of cap and cork disc assemblies from the feeding conveyor K over dividing ways $N^1$, $N^2$, and $N^3$ respectively to the hoppers $M^1$, $M^2$, $M^3$. Caps fitted with the paper discs by the machines $L^1$, $L^2$, and $L^3$ are carried off respectively by conveyors $O^1$, $O^2$, and $O^3$ which discharge upon conveyors $P^1$, $P^2$, and $P^3$ which in turn deliver the completed caps to a receiving box Q. Surplus assemblies of caps and cork discs which the conveyor K carries past all three machines $L^1$, $L^2$, and $L^3$ are deflected laterally by an inclined baffle R so as to fall into a surplus receiving receptacle or chute S.

In its general nature the mechanism for automatically controlling the delivery of articles to the receptacles $D^1$, $D^2$, $D^3$ and $M^1$, $M^2$, $M^3$ is responsive to the quantities of articles in the receptacles for determining whether the articles carried by the feeding conveyors are diverted to the machines or are passed on to succeeding machines. The mechanism operates to effect delivery of articles to a given receptacle when the supply therein is at a predetermined minimum and to discontinue the delivery as soon as the supply builds up to a predetermined maximum. Thus, considering the cork disc inserting machine $C^1$, when the supply of cap blanks in the receptacle $D^1$ decreases to a predetermined minimum, cap blanks carried by the conveyor B are deflected so as to flow over the dividing way $E^1$ into the receptacle $D^1$. When the supply in the receptacle $D^1$ is raised to the predetermined maximum the control mechanism operates to permit the cap blanks to be carried by the conveyor B past the dividing way $E^1$. Assuming that the supply in the receptacle $D^2$ is at or below the predetermined minimum, the control mechanism will operate to divert cap blanks over the dividing way $E^2$ into the receptacle $D^2$. The supplying of articles to the receptacles $D^3$, $L^1$, $L^2$, and $L^3$ is controlled similarly so as to insure that all of the hoppers or receptacles will be fed from time to time and will not become empty.

Figures 2 to 6 inclusive show a preferred form of mechanism for controlling the diverting of articles to the dividing ways. The mechanism associated with each of the dividing ways $E^1$, $E^2$, $E^3$, and $N^1$, $N^2$, $N^3$ is the same so that a description of the controlling mechanism associated with the dividing way $E^1$ will serve also as a description of the mechanism associated with each of the other dividing ways.

The conveyor B is carried by a frame 1 to which the upper end of the dividing way $E^1$ is secured as at 2. The lower end of the dividing way $E^1$ is supported upon the receptacle $D^1$ by brackets 3. The dividing way $E^1$ is inclined downwardly from the conveyor B to the receptacle $D^1$ so that articles deflected into the dividing way will slide into the receptacle.

A bracket 4 secured to the conveyor frame 1 is formed with an offset and upwardly projecting bearing sleeve 5 which pivotally mounts the pintle 6 of a deflecting gate member 7 adapted to be moved to the ineffective position shown in full lines in Figure 2 for permitting articles to be carried by the conveyor B past the dividing way $E^1$ or to be moved to the effective position shown in dash lines for deflecting articles from the conveyor B to the dividing way $E^1$. A collar 8 secured to the upper end of the pintle 6 rests upon the top of the sleeve 5 for supporting the gate 7 and holding it spaced a little above the conveyor B.

Mechanism for actuating or swinging the gate 7 selectively to its two positions referred to above includes an arm 9 fast with the gate. The arm 9 is connected through a link 10 to a rod 11 which extends into a fluid pressure cylinder 12 and is adapted to be projected outwardly, that is toward the right as viewed in Figure 2, when fluid under pressure is admitted to the cylinder 12. A spring 13 connected under tension between the arm 9 and a fixed post 14 urges the arm 9 to rock the gate to the position shown in full lines, that is the position in which it does not deflect articles to the dividing way $E^1$. Admission of fluid under pressure to the cylinder 12 is controlled by electrically operated valve mechanism 15. The cylinder 12 and valve mechanism 15 are not shown in detail since they may be of any suitable or conventional construction. Conductors 16 and 17 lead to the mechanism 15 and are included in an electric circuit, the controlling of which is described hereinafter.

When less than the predetermined supply of articles is in the receptacle $D^1$ the electrical circuit will be completed through the conductors 16 and 17 so that the valve mechanism 15 will admit pressure into the cylinder 12 to force the rod 11 outwardly and swing the gate 7 to the diverting position shown in dash lines in Figure 2. Novel control mechanism is responsive to the piling up of articles in the receptacle $D^1$ for breaking the circuit through the conductors 16—17 and the valve mechanism 15 for relieving the pressure in the cylinder 12 and enabling the spring 13 to contract and swing the gate 7 back to its full line position so as to permit articles to be carried by the conveyor B past the dividing way $E^1$. In the form shown a horizontally disposed shaft 18 is mounted by standards 19 and 20 carried by the receptacle $D^1$. An operating member generally designated 21 is pivotally mounted by the shaft 18, and depends into the receptacle $D^1$ so as to extend transversely to the direction of feeding of articles from the dividing way $E^1$ to the receptacle. The operating member 21 comprises spaced hangers 22—22 clamped to the shaft 18 as at 23—23 and a plate 24 secured to the hangers as at 25. The lower portion 26 of the plate 24 is inclined downwardly and toward the lower or discharge end of the dividing way $E^1$.

The operating member 21 will be substantially in the normal position shown in Figure 3 when the supply of articles in the receptacle $D^1$ is at or below a predetermined minimum. When articles discharged by the dividing way $E^1$ pile up in the receptacle $D^1$ to a predetermined maximum amount, they will pile or crowd against the operating member 21 so as to swing it clockwise as viewed in Figure 3. The provision of the inclined lower plate portion 26 insures that the member 21 will be swung to operating position in response to the predetermined piling of articles within the receptacle $D^1$ without being held back by articles which may have passed under the member 21 before being piled up and into contact with the member 21.

Swinging of the operating member 21 in response to piling up of articles is utilized for opening the electric circuit which energizes the valve mechanism 15. To this end a cam 27 formed with a low part 28 and a rise 29 is secured to the shaft 18 for cooperation with the plunger 30 of a micro switch 31 mounted on a bracket 32 integral with the standard 19. The switch 31 is adapted to be closed when the plunger 30 is extended as shown in Figure 5 wherein the cam 27 is illustrated as occupying a position corresponding to the position of the operating member 21 shown in Figure 3. When the operating member 21 is swung in response to piling of articles in the receptacle $D^1$ the cam rise 29 presses the switch plunger 30 inwardly to break the electrical circuit.

Current for energizing the valve mechanism 15 under control of the switch 31 is furnished by a supply line including conductors 33 and 34 shown in Figure 6. The conductor 16 previously referred to leads from the conductor 33 to the valve mechanism 15, and the conductor 17 leads from the valve mechanism 15 through the switch 31 to a conductor 35 which leads through a cutout switch 36 to the supply line conductor 34. It will be apparent that when the supply of articles in the receptacle $D^1$ is at or below a predetermined minimum the operating member 21 will be in the position shown in Figure 3, the cam 27 will be in the position shown in Figure 5, and the switch 31 will be closed, so that the valve mechanism 15 will be connected across the line 33—34 by means of the conductors 16 and 17, the switch 31, the conductor 35 and the switch 36. When, however, the articles pile up in the receptacle $D^1$ to a predetermined maximum, causing the operating member 21 to be swung clockwise from the position shown in Figure 3, the switch 31 will be opened so as to deenergize the valve mechanism 15 and permit the spring 13 to move the gate 7 away from its article diverting position so as to discontinue delivery of articles over the dividing way $E^1$ to the reception $D^1$.

When the supply of articles in the receptacle $D^1$ is lessened to the predetermined minimum the operating member 21 will swing back to the position shown in Figure 3 so as to relieve the plunger 30 and effect closing of the switch 31 and energizing of the valve mechanism 15. This will cause fluid under pressure to be admitted to the cylinder 12 to project the rod 11 outwardly and swing the gate 7 back to its article diverting position. Supplying of articles over the dividing way $E^1$ to the receptacle $D^1$ will then be resumed.

As previously stated the mechanism for controlling the diverting of articles over the dividing ways $E^2$, $E^3$, $L^1$, $L^2$, and $L^3$ is the same as the mechanism for controlling the flow of articles over the dividing way $E^1$. Figure 6 shows diagrammatically the electrical connections associated with the control mechanism for the dividing ways $E^1$, $E^2$, and $E^3$. Similar electrical connections are provided for the control mechanism associated with the dividing ways $N^1$, $N^2$, and $N^3$.

The capacity of the press $A^1$ is greater than the combined capacities of each group of machines $C^1$, $C^2$, $C^3$, and $L^1$, $L^2$, and $L^3$. In a preferred arrangement for use in the manufacturing of crown caps, the press $A^1$ has a capacity or production rate of 1600 cap blanks per minute and each of the machines $C^1$, $C^2$, $C^3$, and $L^1$, $L^2$, and $L^3$ has a capacity of 533 caps per minute. Thus, when all of the machines are operating an adequate supply of work articles will be maintained in the hoppers or receptacles in readiness to be received and worked upon by each of the machines $C^1$, $C^2$, $C^3$ and $L^1$, $L^2$, $L^3$. If any one of the machines should be disabled the others will continue to operate so that it will not be necessary to shut down the whole production line. This advantage is obtained by controlling the diverting of articles from the conveyors B and K to the several dividing ways in response to the amounts of articles in the receptacles and without stopping the feed conveyors B and K at any time. When the supply of articles in the receptacle $D^1$ is at the predetermined maximum, the associated gate 7 will be moved to non-diverting position so as to discontinue delivery of articles over the dividing way $E^1$ without stopping the feeding conveyor B. If the machine $C^1$ should break down the built-up supply of articles in the receptacle $D^1$ will automatically effect discontinuing of the delivery of articles over the dividing way $E^1$ so that the articles will not build up and overflow the receptacle $D^1$ but will be carried past the machine $C^1$ to the machines $C^2$ and $C^3$. Production of the machines $C^2$ and $C^3$ can continue while the machine $C^1$ is being repaired. If repairs can be effected within a reasonably short time the machines $L^1$, $L^2$, and $L^3$ will not become starved for work articles because the supply of articles already in the receptacles $M^1$, $M^2$, and $M^3$ will serve as a cushion for the associated machines to draw upon.

The mechanism shown by way of illustration embodies the invention in the form now preferred but it will be understood that changes may be made without departing from the invention as defined in the claims.

I claim:

1. In automatic control mechanism for article conveyors the combination of a conveyor having a dividing way of passage; a receptacle for receiving articles from said dividing way; a deflector gate; means mounting said gate to be moved selectively to an effective position for deflecting articles from said conveyor to said dividing way or to an ineffective position in which it does not deflect the articles to said dividing way; spring means urging said gate to one of said positions; fluid pressure operated means for moving said gate to the other of said positions; electrical means for controlling the operation of said fluid pressure operated means; a shaft; a plate secured to said shaft; means pivoting said shaft and plate to swing about a substantially horizontal axis with the plate depending into said receptacle whereby said plate is adapted to be swung by articles piled up in said receptacle; a cam on said shaft; and a switch operable by said cam for controlling said electrical means.

2. In automatic control mechanism for article conveyors the combination of a conveyor having a dividing way of passage; a deflector gate; means mounting said gate to be moved selectively to an effective position for deflecting articles from said conveyor to said dividing way or to an ineffective position in which it does not deflect the articles to said dividing way; spring means urging said gate to one of said positions; fluid pressure operated means for moving said gate to the other of said positions; electrical means for controlling the operation of said fluid pressure operated means; a plate having an inclined bottom portion; means pivoting said plate to swing about a substantially horizontal axis and to depend into said receptacle, the inclination of said plate bottom portion being downwardly and towards the point of discharge of articles from said dividing way into said receptacle whereby said plate is adapted to be swung by articles piled up in said receptacle; a cam movable in response to such swinging of said plate; and a switch operable by said cam for controlling said electrical means.

HENRY A. FINK.